(No Model.)
W. H. RAND.
CULTIVATOR.
No. 429,955. Patented June 10, 1890.
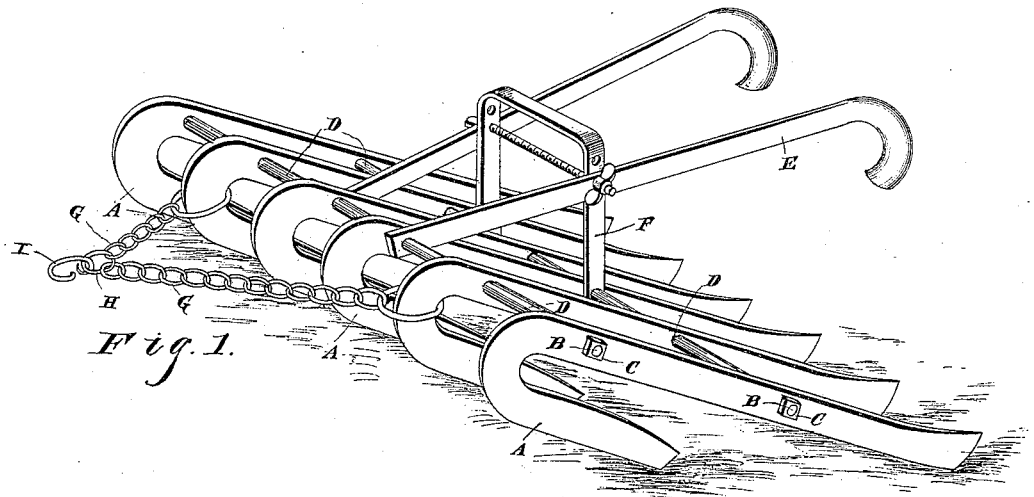
Fig. 1.
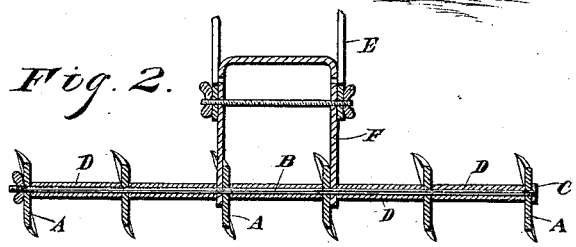
Fig. 2.
Fig. 3.
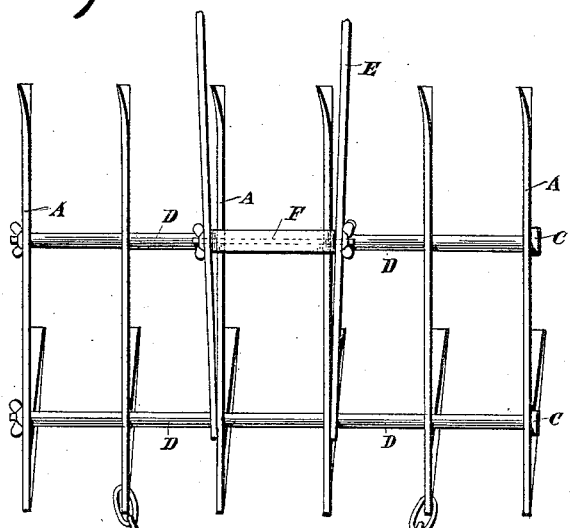
Witnesses,
J. M. Withrow
C. L. Siggers
Inventor
William H. Rand,
By his Attorneys
C. A. Snow & Co

UNITED STATES PATENT OFFICE.

WILLIAM H. RAND, OF GARNER, NORTH CAROLINA.

CULTIVATOR.

SPECIFICATION forming part of Letters Patent No. 429,955, dated June 10, 1890.

Application filed November 9, 1889. Serial No. 329,738. (No model.)

*To all whom it may concern:*

Be it known that I, WILLIAM H. RAND, a citizen of the United States, residing at Garner, in the county of Wake and State of North Carolina, have invented a new and useful Cultivator, of which the following is a specification.

My invention relates to improvements in cultivators; and it consists in certain novel features of construction, hereinafter described and claimed.

In the accompanying drawings, Figure 1 is a perspective view of my improved cultivator. Fig. 2 is a transverse sectional view, and Fig. 3 is a plan view, of the cultivator.

Referring to the drawings by letter, A designates the teeth of my improved cultivator, which are composed of flat J-shaped bars having arms of unequal length, and having their ends bent or twisted in reverse directions, so that they will rest on the ground and turn the dirt to opposite sides. The teeth are arranged parallel to each other in any desired number, as clearly shown in the drawings, and they are secured together by means of the rods B inserted transversely through the teeth and having securing-nuts C on their ends. The teeth are held at the desired distance apart by the spacing-sleeves D, which are arranged around the rods between the teeth, as shown most clearly in Fig. 2.

The handles E are secured at their front ends to the front transverse rod B, and project upward and rearward therefrom, and at an intermediate point of their length they are secured to the yoke F, which rises from the rear transverse rod B.

The draft is applied to the cultivator by means of the diverging chains G G, which are engaged over the cultivator-teeth at the front ends of the same and are connected by a ring H, on which a hook or clevis I is mounted.

In practice the cultivator is drawn over the ground in the usual manner, and the ends of the teeth will cut into the ground, and by reason of the reverse twists will throw the dirt to opposite sides, so as to form straight and deep furrows and at the same time thoroughly pulverize the dirt, as will be readily understood.

It will be observed from the foregoing description, taken in connection with the accompanying drawings, that I have provided a cultivator which is composed of few parts, and which can be easily manipulated. Each tooth, it will be observed, acts on two different points of the ground, so that the work will be rapidly accomplished.

The device can be easily drawn over the ground, and the teeth are effectually and positively held at the desired distance apart and prevented from all lateral motion.

Having thus described my invention, what I claim, and desire to secure by Letters Patent, is—

1. A cultivator composed of a series of J-shaped bars arranged parallel and secured together and having their longer arms arranged in rear of their shorter arms, and having both arms oppositely twisted at their extremities to form oppositely-disposed teeth, substantially as specified.

2. A cultivator composed of a series of J-shaped bars arranged parallel and secured together by a pair of tie bolts or rods, said bars having their longer arms arranged in rear of their shorter, and said arms being oppositely twisted to form cultivator-teeth, the yoke secured to the rear bolt, and the handles adjustably secured to the yoke and pivoted to the front bolt, substantially as specified.

3. The herein-described cultivator-tooth, consisting of a flat bar bent upon itself in the form of the letter J, said bar having its longer terminals arranged in rear of its shorter terminals, the extremities of said terminals being deflected in opposite directions to form teeth, substantially as specified.

4. In a cultivator, the combination, with a series of J-shaped bars, the extremities of the two arms of which form cultivator-teeth, of rings encircling two of the intermediate bars at their forward curved portions, chains connected to the rings and converging toward their front ends, a ring connecting said ends, and a clevis-hook mounted in the ring, substantially as specified.

5. In a cultivator, a tooth formed of a flat bar bent into the form of the letter J, the extremities of which are deflected or twisted to form cultivator-teeth, substantially as specified.

In testimony that I claim the foregoing as my own I have hereto affixed my signature in presence of two witnesses.

WILLIAM H. RAND.

Witnesses:
G. E. LEACH,
S. T. RASBERRY.